(12) United States Patent
Nishio

(10) Patent No.: US 10,965,832 B2
(45) Date of Patent: Mar. 30, 2021

(54) INFORMATION PROCESSING APPARATUS SAVING FAX TRANSMISSION SETTINGS FOR REDISPLAY

(71) Applicant: Masahide Nishio, Kanagawa (JP)

(72) Inventor: Masahide Nishio, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/706,951

(22) Filed: Dec. 9, 2019

(65) Prior Publication Data

US 2020/0204700 A1    Jun. 25, 2020

(30) Foreign Application Priority Data

Dec. 25, 2018  (JP) .............................. JP2018-241832
Jun. 26, 2019  (JP) .............................. JP2019-118947

(51) Int. Cl.
*H04N 1/32*    (2006.01)
*H04N 1/00*    (2006.01)

(52) U.S. Cl.
CPC ....... *H04N 1/32101* (2013.01); *H04N 1/0044* (2013.01); *H04N 2201/0093* (2013.01)

(58) Field of Classification Search
CPC ................. H04N 1/0044; H04N 2201/0093
USPC ........ 358/1.15, 1.9, 1.18; 715/204, 273, 274
See application file for complete search history.

(56) References Cited

U.S. PATENT DOCUMENTS

| 2006/0195495 A1 | 8/2006 | Asano |
| 2009/0237728 A1 | 9/2009 | Yamamoto |
| 2010/0064211 A1* | 3/2010 | Kujirai ................. G06F 3/1256 715/274 |
| 2012/0120452 A1* | 5/2012 | Utsunomiya ...... H04N 1/00474 358/1.15 |

FOREIGN PATENT DOCUMENTS

| JP | 2000-207084 | 7/2000 |
| JP | 2006-238199 | 9/2006 |
| JP | 2007-166202 | 6/2007 |
| JP | 5137641 | 2/2013 |

* cited by examiner

*Primary Examiner* — Jamares Q Washington
(74) *Attorney, Agent, or Firm* — Oblon, McClelland, Maier & Neustadt, L.L.P.

(57) ABSTRACT

An information processing apparatus, to which a facsimile device is communicably connected, includes an input device to receive operation of a user, a memory, and a hardware processor controlling the facsimile device to fax print data. The hardware processor is configured to: cause a display device to display a first setting screen for making settings based on operation received by the input device; cause the display device to display a preview screen representing an output image of fax transmission based on the settings made on the first setting screen; store, in the memory, setting values being input via the first setting screen; and cause the display device to display, when a cancellation operation of fax transmission is performed on the preview screen, a second setting screen corresponding to the first setting screen on which at least part of the setting values stored in the memory have been displayed.

11 Claims, 12 Drawing Sheets

INFORMATION PROCESSING APPARATUS SAVING FAX TRANSMISSION SETTINGS FOR REDISPLAY

CROSS-REFERENCE TO RELATED APPLICATIONS

The present application claims priority under 35 U.S.C. § 119 to Japanese Patent Application No. 2018-241832, filed on Dec. 25, 2018 and Japanese Patent Application No. 2019-118947, filed on Jun. 26, 2019. The contents of which are incorporated herein by reference in their entirety.

BACKGROUND OF THE INVENTION

1. Field of the Invention

The present invention relates to an information processing apparatus, an information processing method, and a recording medium.

2. Description of the Related Art

A technique of causing a facsimile device having a facsimile function to fax print data (personal computer (PC)-facsimile (FAX) transmission) has been used. In such a technique, a function of displaying a preview screen representing transmission contents before transmission and asking a user whether to permit transmission is provided.

For example, a configuration of a device having a function of displaying a preview screen is disclosed, the configuration being for cancelling a job of fax transmission when the cancellation is instructed on the preview screen (Japanese Examined Patent Application Publication No. 2000-207084).

In the conventional technique, however, when the cancellation is instructed on the preview screen and the job is canceled, setting values (for example, a destination address and a paper size) that have been set before are lost. Thus, a user is required to repeat the same setting operation.

SUMMARY

According to one aspect of the present disclosure, an information processing apparatus, to which a facsimile device is communicably connected, includes: an input device configured to receive operation of a user; a memory; and a hardware processor coupled to the input device and the memory, the hardware processor controlling the facsimile device to fax print data. The hardware processor is configured to: cause a display device to display a first setting screen for making settings based on operation received by the input device; cause the display device to display a preview screen representing an output image of fax transmission based on the settings made on the first setting screen; store, in the memory, setting values being input via the first setting screen; and cause the display device to display, when a cancellation operation of fax transmission is performed on the preview screen, a second setting screen corresponding to the first setting screen on which at least part of the setting values stored in the memory have been displayed.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
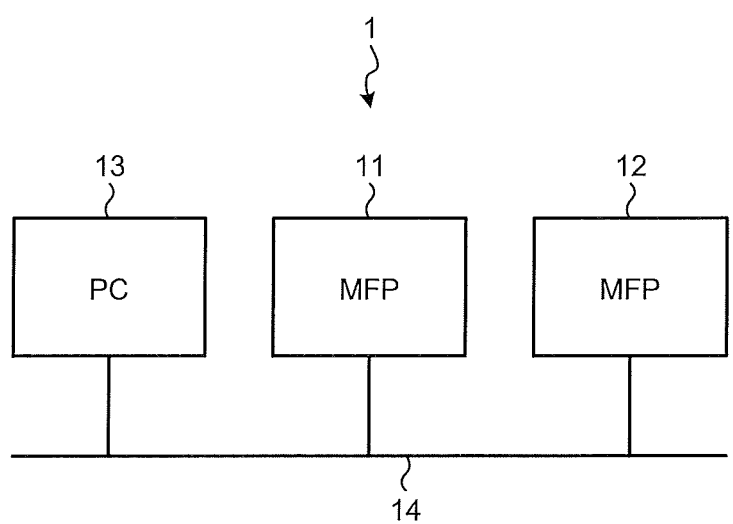
FIG. 1 is a diagram illustrating an example of a system configuration of a data transmission system according to a first embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An object of each embodiment is to improve convenience of a setting operation.

Exemplary embodiments of an information processing apparatus, an information processing method, and a recording medium according to the present invention will be described in detail below with reference to the accompanying drawings.

First Embodiment

FIG. 1 is a diagram illustrating an example of a system configuration of a data transmission system 1 according to a first embodiment. The data transmission system 1 according to the present embodiment includes multifunction peripherals (MFPs) 11 and 12, and a personal computer (PC) 13.

Each of the MFPs 11 and 12 is a device that has multiple functions such as printing, copy, scan, and facsimile functions. Each of the MFPs 11 and 12 is an example of the "facsimile device" having a facsimile function.

The PC 13 receives operation performed by a user and performs processing for controlling the MFPs 11 and 12. The PC 13 is an example of the "information processing apparatus" having a function of controlling the MFPs 11 and 12 (facsimile devices) to fax print data. While a concrete configuration of the PC 13 should not be particularly limited, the PC 13 may be a general-purpose computer such as a desktop computer, a notebook computer, a tablet terminal, and a smartphone. The "information processing apparatus" is not limited to a general-purpose computer, and may be a special-purpose terminal specialized in a function of faxing print data.

The MFPs 11 and 12, the PC 13, and other facsimile devices (devices that receive data faxed from the MFPs 11 and 12) are communicably connected to one another through an appropriate communication path 14. While a concrete configuration of the communication path 14 should not be particularly limited, the communication path 14 may be a communication path utilizing, for example, Ethernet (registered trademark), a universal serial bus (USB), a wireless local area network (LAN), the Internet, and a public switched telephone network. The connected number of the PC 13 and the MFPs 11 and 12 is not limited to the number described above, and may be determined arbitrarily depending on usage conditions.

Figure 2:
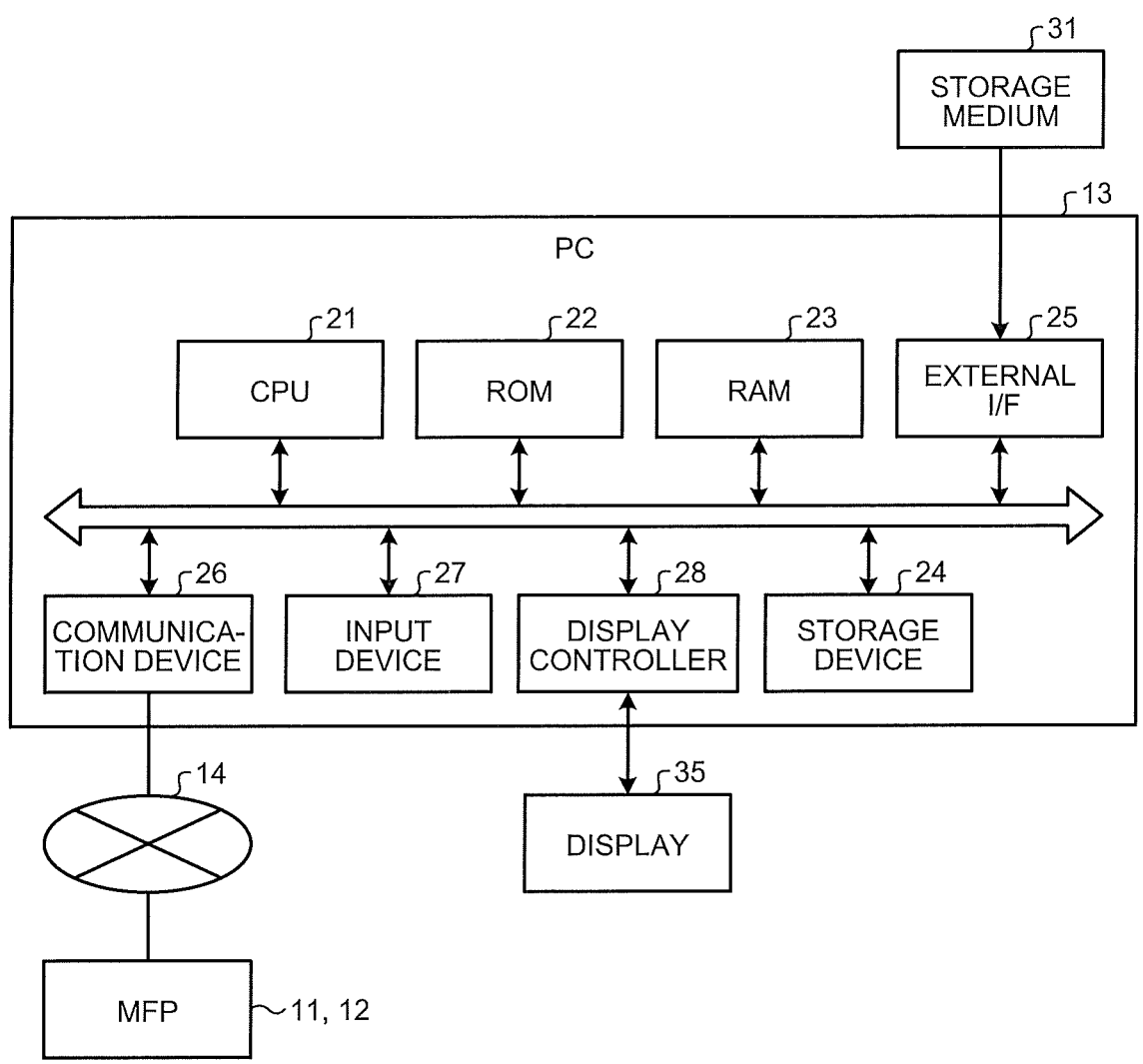
FIG. 2 is a diagram illustrating an example of a hardware configuration of a personal computer (PC) according to the first embodiment.

FIG. 2 is a diagram illustrating an example of the hardware configuration of the PC 13 according to the first embodiment. The PC 13 includes a central processing unit (CPU) 21, a read only memory (ROM) 22, a random access memory (RANI) 23, a storage device 24, an external interface (I/F) 25, a communication device 26, an input device 27, and a display controller 28.

The CPU 21 performs various kinds of arithmetic processing in accordance with a computer program and controls the entire operation of the PC 13. The ROM 22 is a read-only non-volatile storage medium, and stores a computer program such as firmware. The RAM 23 is a volatile storage medium capable of reading and writing information at a high speed. The RAM 23 is used as a work area when the CPU 21 performs arithmetic processing. The storage device 24 is a non-volatile storage medium capable of reading and writing information. The storage device 24 stores an operating system (OS), a control program, an application programs, and the like. The external I/F 25 is a device capable of reading and writing information with an external storage medium 31. The communication device 26 is a device for establishing communication with external devices such as the MFPs 11 and 12 through the communication path 14. The input device 27 is a user interface (I/F) that receives an input operation performed by the user. The input device 27 may be, for example, a keyboard, a mouse, and a touch panel mechanism. The display controller 28 is a device that controls display of an image on a display 35 serving as a visual user I/F.

The hardware configuration in FIG. 2 is illustrated as an example. The concrete hardware configuration of the PC 13 (information processing apparatus) can be formed by appropriately utilizing a known or a new technique.

Figure 3:
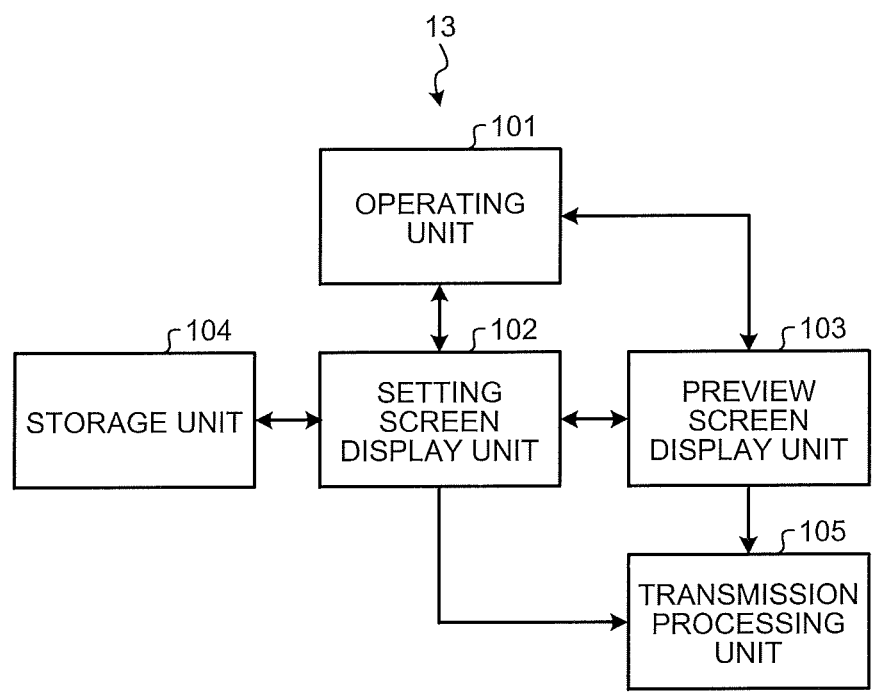
FIG. 3 is a diagram illustrating an example of a functional configuration of the PC according to the first embodiment.

FIG. 3 is a diagram illustrating an example of a functional configuration of the PC 13 according to the first embodiment. The PC 13 includes an operating unit 101, a setting screen display unit 102, a preview screen display unit 103, a storage unit 104, and a transmission processing unit 105.

The operating unit 101 receives operation related to printing or facsimile performed by a user. The operating unit 101 is implemented by collaboration among, for example, the CPU 21, the input device 27, and the display controller 28.

The setting screen display unit 102 causes a predetermined display device (the display 35 and the like) to display a setting screen (the first setting screen) for performing by a user a setting operation related to printing or facsimile. The setting screen display unit 102 is implemented by collaboration among, for example, the CPU 21 and the display controller 28.

The preview screen display unit 103 causes, before fax transmission is executed, a predetermined display device (the display 35 and the like) to display a preview screen representing transmission contents. The preview screen display unit 103 is implemented by collaboration among, for example, the CPU 21 and the display controller 28.

The storage unit 104 stores setting values that are input via a setting screen. The storage unit 104 is implemented by collaboration among, for example, the CPU 21 and the storage device 24.

The transmission processing unit 105 performs processing for controlling the MIPs 11 and 12 to perform fax transmission based on information acquired via the setting screen and the preview screen. The transmission processing unit 105 is implemented by collaboration among, for example, the CPU 21 and the communication device 26.

A preview screen is configured to receive a cancellation operation performed by a user. When the cancellation operation is performed on the preview screen, the setting screen display unit 102 causes the display 35 to display a setting screen (the second setting screen) corresponding to the foregoing setting screen (the first setting screen) on which at least part of the setting values stored in the storage unit 104 are reflected (namely, have been displayed). This function enables a user to save the trouble of repeating the same setting operation when the cancellation operation is performed.

Figure 4:
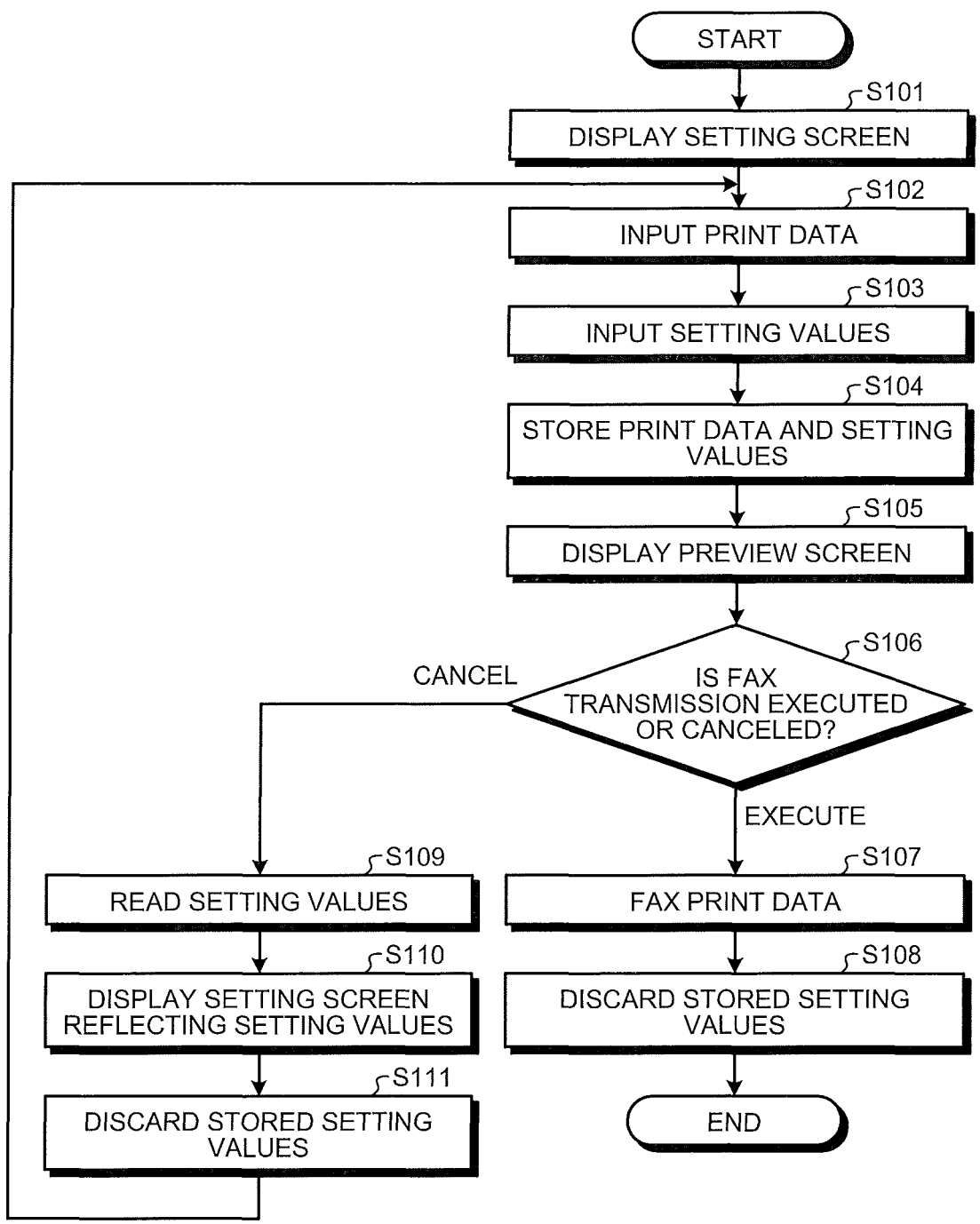
FIG. 4 is a flowchart illustrating an example of processing performed by the PC according to the first embodiment.

FIG. 4 is a flowchart illustrating an example of processing performed by the PC 13 according to the first embodiment. After the setting screen display unit 102 causes the display 35 to display a setting screen (the first setting screen) (S101), the user inputs print data (documents and the like to be faxed) (S102) by operating the operating unit 101 and inputs setting values related to fax transmission (for example, a destination address and paper size) (S103). The storage unit 104 stores the input print data and setting values (S104). The preview screen display unit 103 causes the display 35 to display a preview screen representing contents of fax transmission based on the print data and the setting values input by the user (S105).

The operating unit 101 determines which of an execution operation for executing fax transmission and a cancellation operation for cancelling fax transmission is executed on a preview screen (S106). When the execution operation is performed ("Execution" at S106), the transmission processing unit 105 faxes the print data to a destination address indicated by the setting values (S107). The setting values stored in the storage unit 104 are discarded (S108).

On the other hand, when the cancellation operation is performed ("Cancel" at S106), the setting screen display unit 102 reads setting values stored in the storage unit 104 (S109) and causes the display 35 to display a setting screen (the second setting screen) corresponding to the foregoing setting screen (the first setting screen) on which at least part of the readout setting values have been displayed (S110).

After that, the setting values stored in the storage unit 104 are discarded (S111), and the processing after step S102 (resetting of print data and setting values) is performed again.

According to the above processing, a setting screen (the second setting screen) to be displayed upon resetting is displayed to include at least part of the previously input setting values. Thus, a resetting operation performed by the user can be simplified. Values corresponding to "at least part of the previously input setting values" include the entire setting values that were input by the user. Values corresponding to "at least part of the previously input setting values" include part of the setting values that were input by the user. A concrete example of "at least part of the previously input setting values" can be found in a case in which settings of paper size and the like are taken over, whereas a destination address is discarded. While the example in which not only setting values but also print data is reset (input again) upon cancellation is described above, print data may be stored in the storage unit 104 in order to omit a reset operation of the print data upon cancelation.

Figure 5:
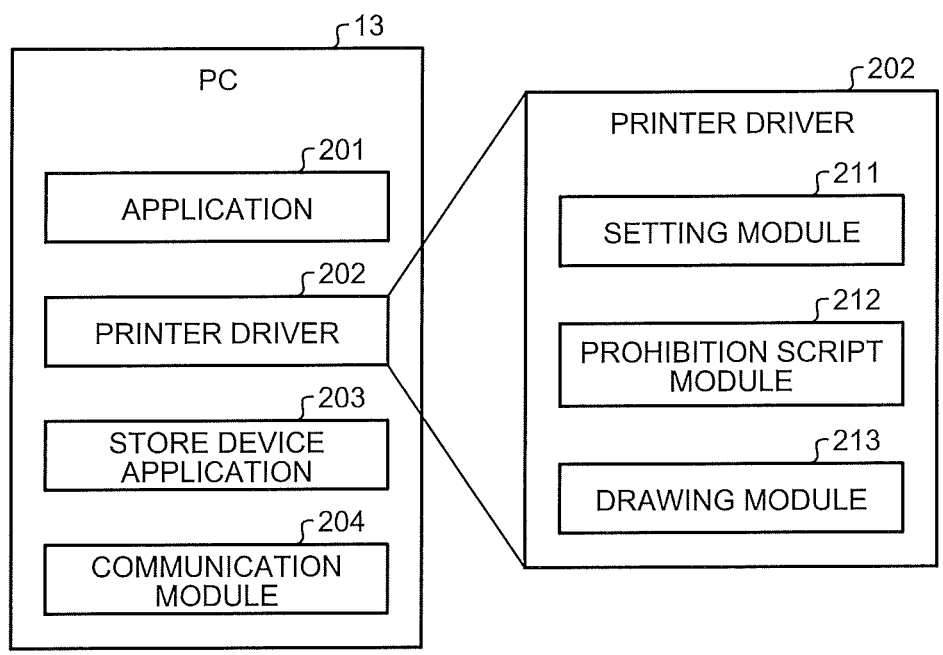
FIG. 5 is a diagram illustrating an example of a software configuration of the PC according to the first embodiment.

FIG. 5 is a diagram illustrating an example of the software configuration of the PC 13 according to the first embodiment. Software (a computer program) installed in the PC 13 includes an application 201, a printer driver 202, a store device application 203, and a communication module 204.

The application 201 includes a user I/F for using a print function, a fax transmission function, and the like. The printer driver 202 is system software for controlling operation of the PC 13 at the time of operating the MFPs 11 and 12. The store device application 203 is an application to be installed, which is acquired from the MFPs 11 and 12 connected to the PC 13. The communication module 204 is software for faxing print data to the MFPs 11 and 12.

The printer driver 202 includes a setting module 211, a prohibition script module 212, and a drawing module 213. The setting module 211 performs processing related to various kinds of setting operations. The setting operations according to the present embodiment include print settings for making settings related to print data and transmission settings for making settings related to fax transmission. The prohibition script module 212 performs control related to prohibition processing. The drawing module 213 performs processing related to drawing of the setting screen and the preview screen.

Figure 6:
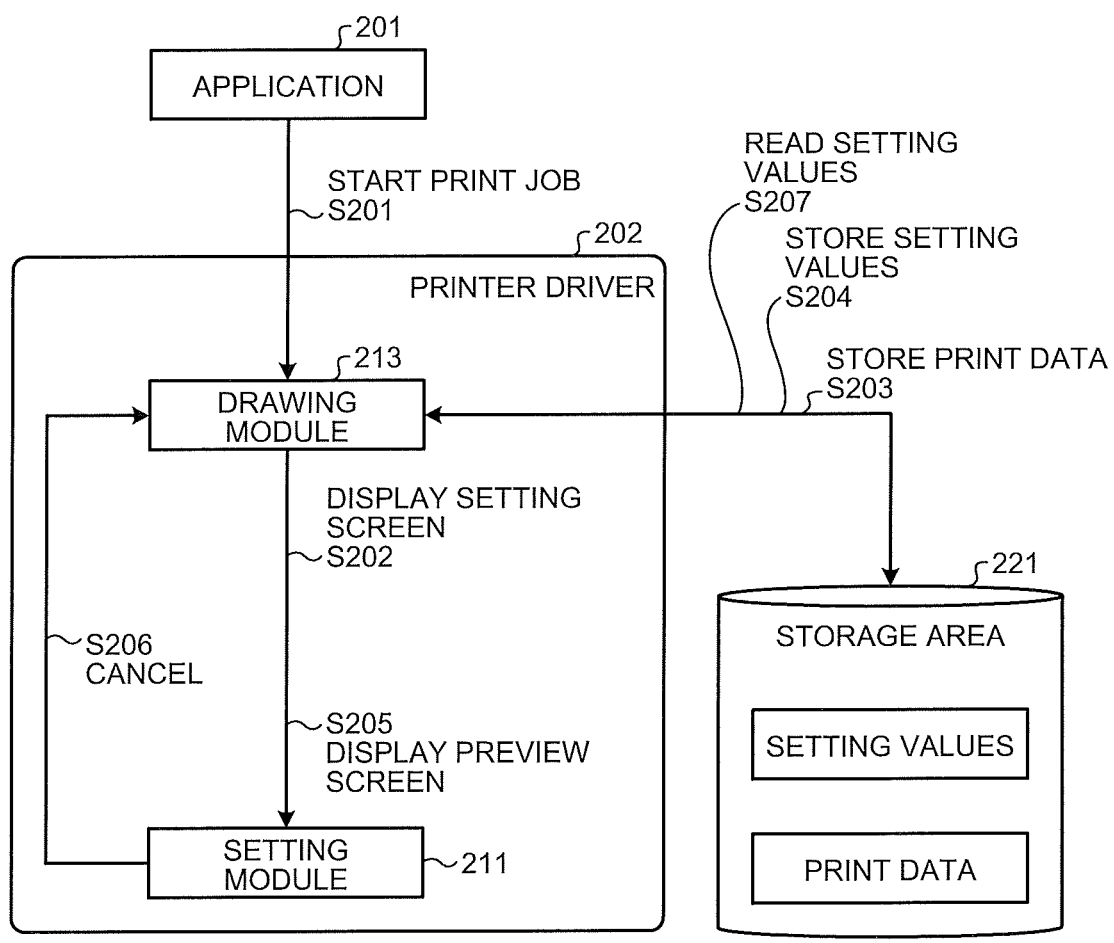
FIG. 6 is a diagram schematically illustrating an example of processing performed by a printer driver according to the first embodiment.

FIG. 6 is a diagram schematically illustrating an example of processing performed by the printer driver 202 according to the first embodiment. On performing, by the user, operation for starting a print job through the application 201 (S201), the drawing module 213 of the printer driver 202 causes a predetermined display device (the display 35) to display a setting screen (S202). The setting screen (the first setting screen) according to the present embodiment includes a print setting screen for making print settings and a transmission setting screen for making transmission settings.

When a user inputs, on a setting screen, print data to be faxed and setting values related to fax transmission, the print data and the setting values are stored in a predetermined storage area 221 (the storage device 24) (S203 and S204). The storage area 221 may be a local file, a registry, and the like. In a case of a V4 driver, PropertyBag (for example, UserPropertyBag and QueuePropertyBag) can be used.

After that, the drawing module 213 causes the display 35 to display the preview screen based on the print data and the setting values input by the user (S205). When a user performs a cancellation operation on a preview screen (S206), the drawing module 213 reads the setting values stored in the storage area 221 (S207) and causes the display 35 to display a setting screen (the second setting screen) corresponding to the foregoing setting screen (the first setting screen) on which at least part of the readout setting values have been displayed (S202).

Figure 7:
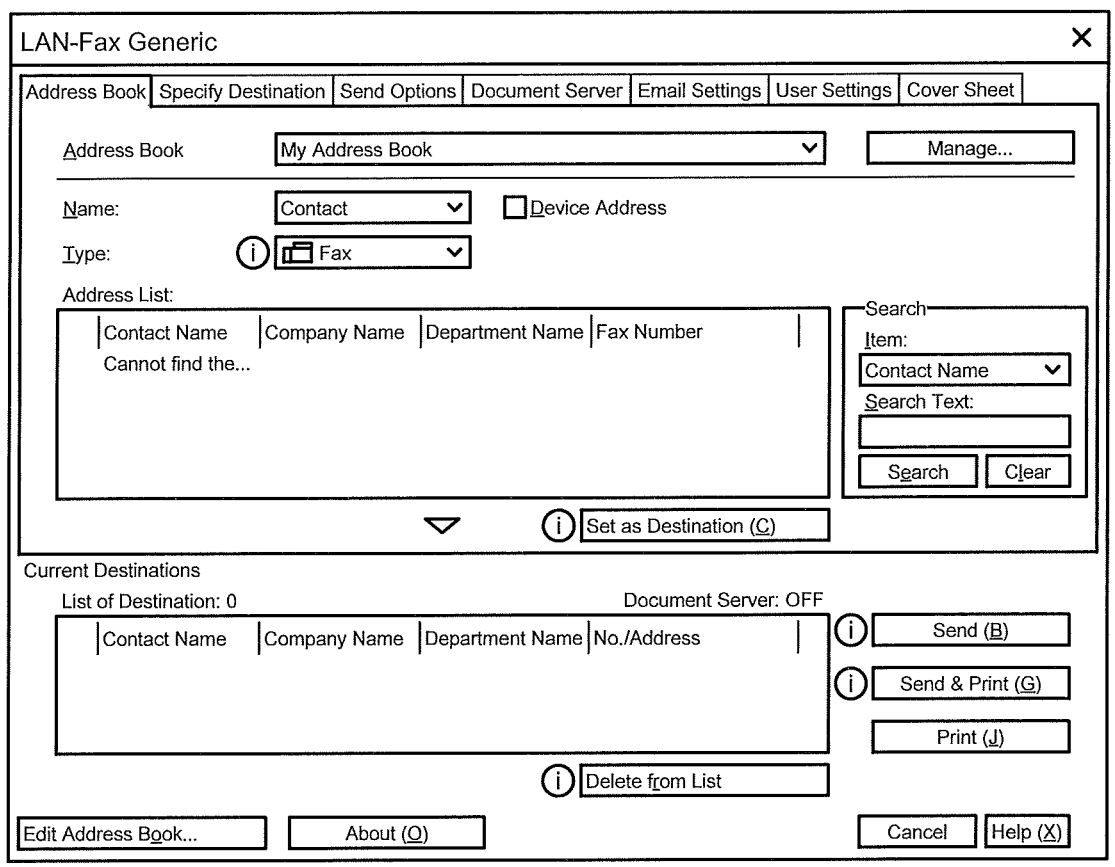
FIG. 7 is a view illustrating an example of a transmission setting screen according to the first embodiment.

FIG. 7 is a view illustrating an example of a transmission setting screen 303 according to the first embodiment. The transmission setting screen 303 exemplified in the present embodiment includes an input space for setting a destination address (Address Book), an input space for setting an attachment file (Send Options), an input space for setting a cover letter (Cover Sheet), and the like. FIG. 7 is merely an example, and the configuration of the transmission setting screen 303 should be designed as appropriate depending on usage conditions.

Figure 8:
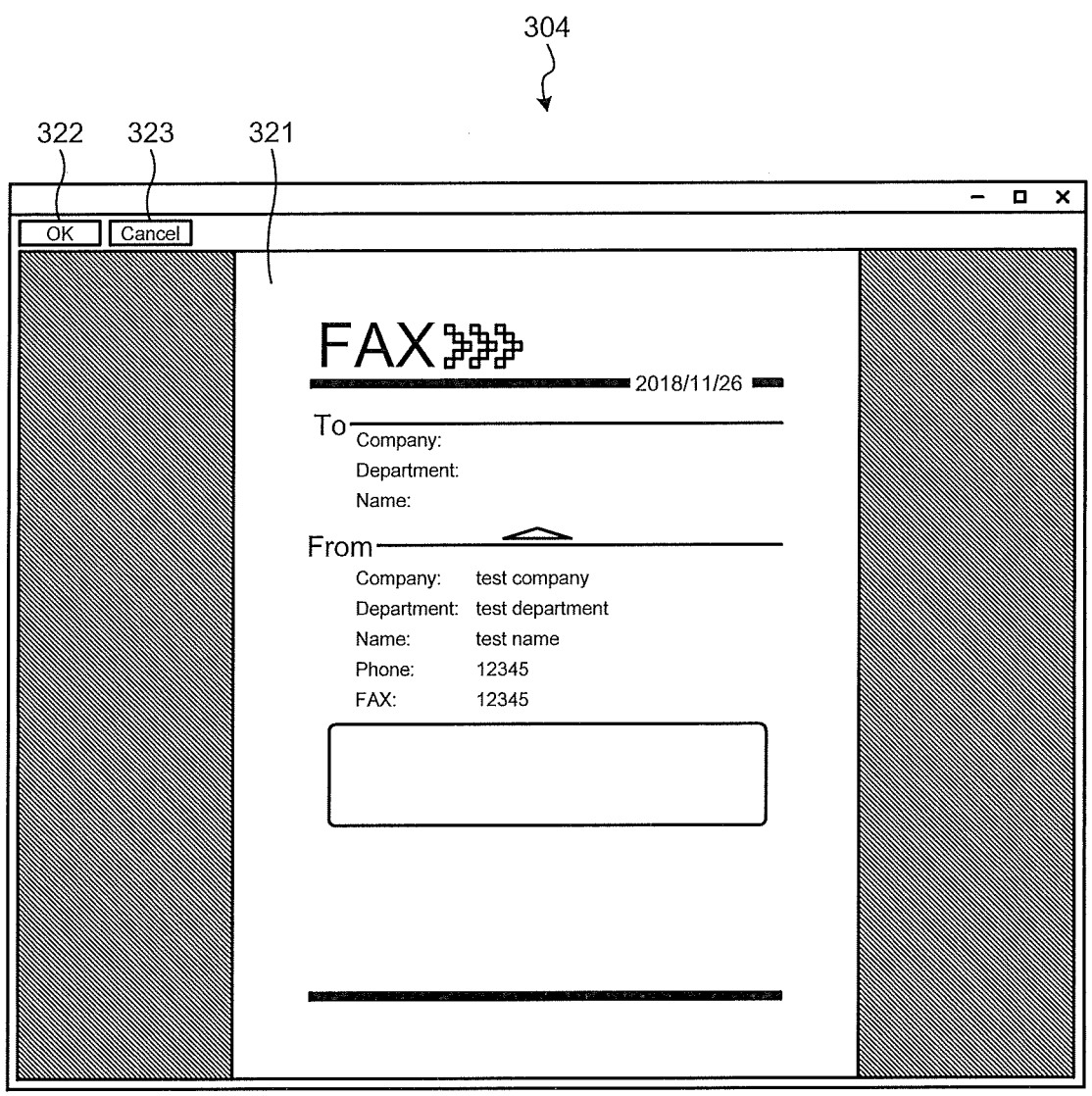
FIG. 8 is a view illustrating an example of a preview screen according to the first embodiment.

FIG. 8 is a view illustrating an example of a preview screen 304 according to the first embodiment. The preview screen 304 exemplified in the present embodiment includes an image display space 321 for displaying an output image of fax transmission, an OK button 322 for executing the fax transmission, and a cancellation button 323 for cancelling the fax transmission.

Figure 9:
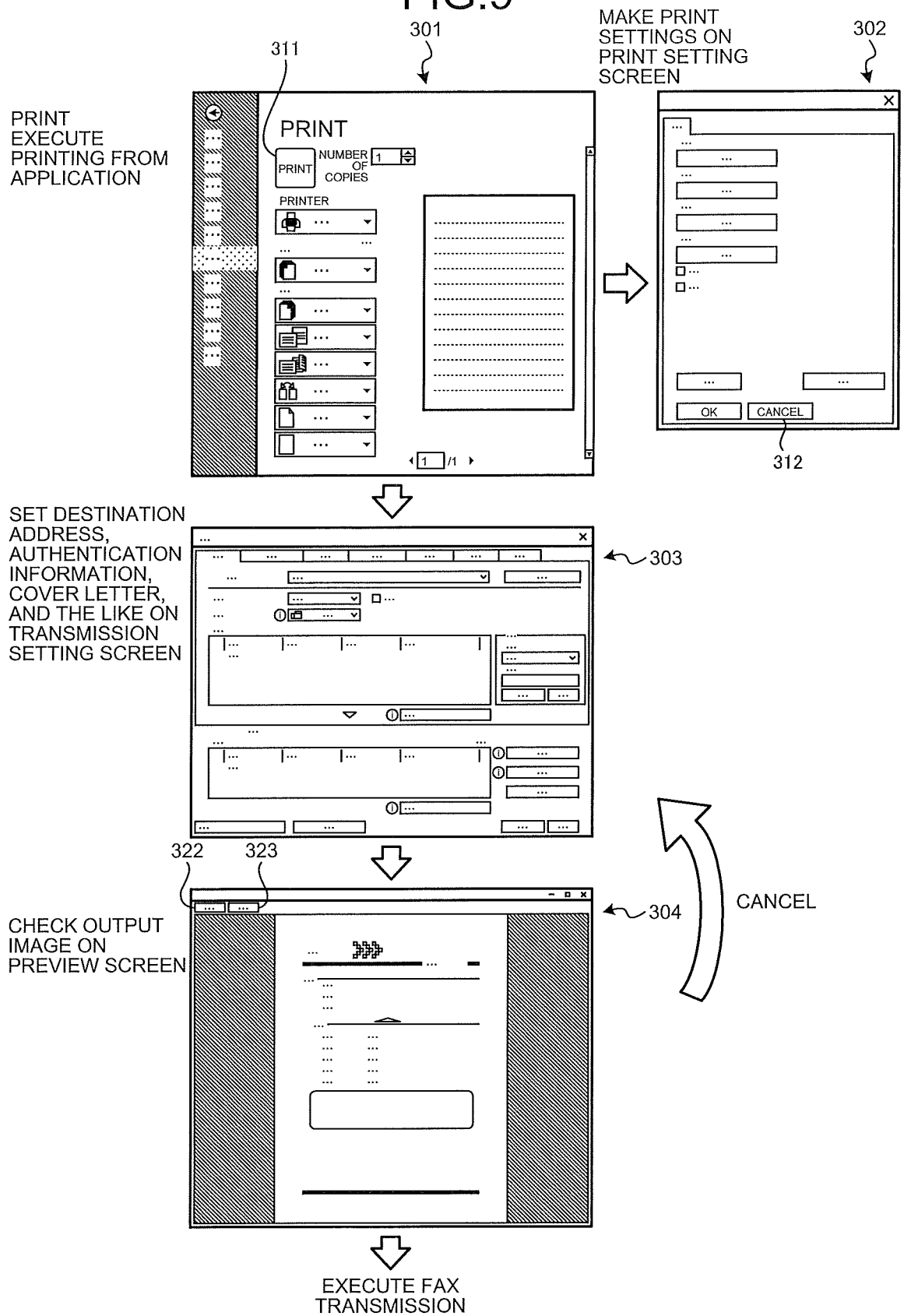
FIG. 9 is a view illustrating an example of transition of screens displayed on the PC according to the first embodiment.

FIG. 9 is a view illustrating an example of transition of screens displayed on the PC 13 according to the first embodiment. In FIG. 9, a print application screen 301, a print setting screen 302, the transmission setting screen 303, and the preview screen 304 are exemplified.

The print application screen 301 is a screen displayed when an application for printing a document designated by a user is activated. The print application screen 301 exemplified in the present embodiment is configured to individually call up the print setting screen 302 for making print settings and the transmission setting screen 303 for making transmission settings.

When printing is performed, all settings are made on the print setting screen 302 before a print button 311 provided on the print application screen 301 is pressed. When a cancellation button 312 provided on the print setting screen 302 is pressed, setting values (for example, paper size and the like) that have been set before are lost.

Print data to be faxed is set by print settings made on the print setting screen 302. A concrete configuration of the print setting screen 302 is not particularly limited. The print setting screen 302 may be configured so that the settings of, for example, a document, a paper orientation, paper size, and resolution can be made. Setting values related to fax transmission are set by transmission settings made on the transmission setting screen 303 exemplified in FIG. 7.

When the OK button 322 provided on the preview screen 304 is pressed, fax transmission is executed based on the print settings and the transmission settings that have been made before. On the other hand, when the cancellation button 323 is pressed, transmission settings are made again (and print settings may be made again).

Meanwhile, as described above, in the case of the fax transmission, there are two types of settings. The one is the setting made on the print setting screen 302 before the print button 311 is pressed, and the other is the setting made on the transmission setting screen 303 after the print button 311 is pressed.

Conventionally, pressing of the cancellation button (323) provided on the preview screen (304) means that cancellation is performed after the print button (311) is pressed. Thus, in this case, it is determined that a job started by the pressing of the print button (311) is canceled, and thereby the job is terminated.

However, in reality, there are many use cases in which the cancellation button (323) is pressed because an input error of settings (a destination address and the like) related to fax transmission, which was made on the transmission setting screen (303), is found in the preview screen (304). Thus, if the job itself is canceled, the settings related to fax transmission input via the transmission setting screen (303) need to be input again.

Considering above, in the present embodiment, when the cancellation button 323 provided on the preview screen 304 is pressed, the transmission setting screen 303 (the second setting screen) is displayed, on which at least part of the setting values of the fax transmission settings that have already been input via the transmission setting screen 303 (the first setting screen) are reflected. For example, the transmission setting screen 303 (the second setting screen) displayed after the cancellation button 323 is pressed may be displayed in a state where at least one of a destination address, an authentication information, a cover letter, and an attachment file, which have been input before the cancellation button 323 is pressed, is already input (i.e., displayed). This configuration is able to save a user the trouble of repeatedly inputting the same setting values.

Figure 10:
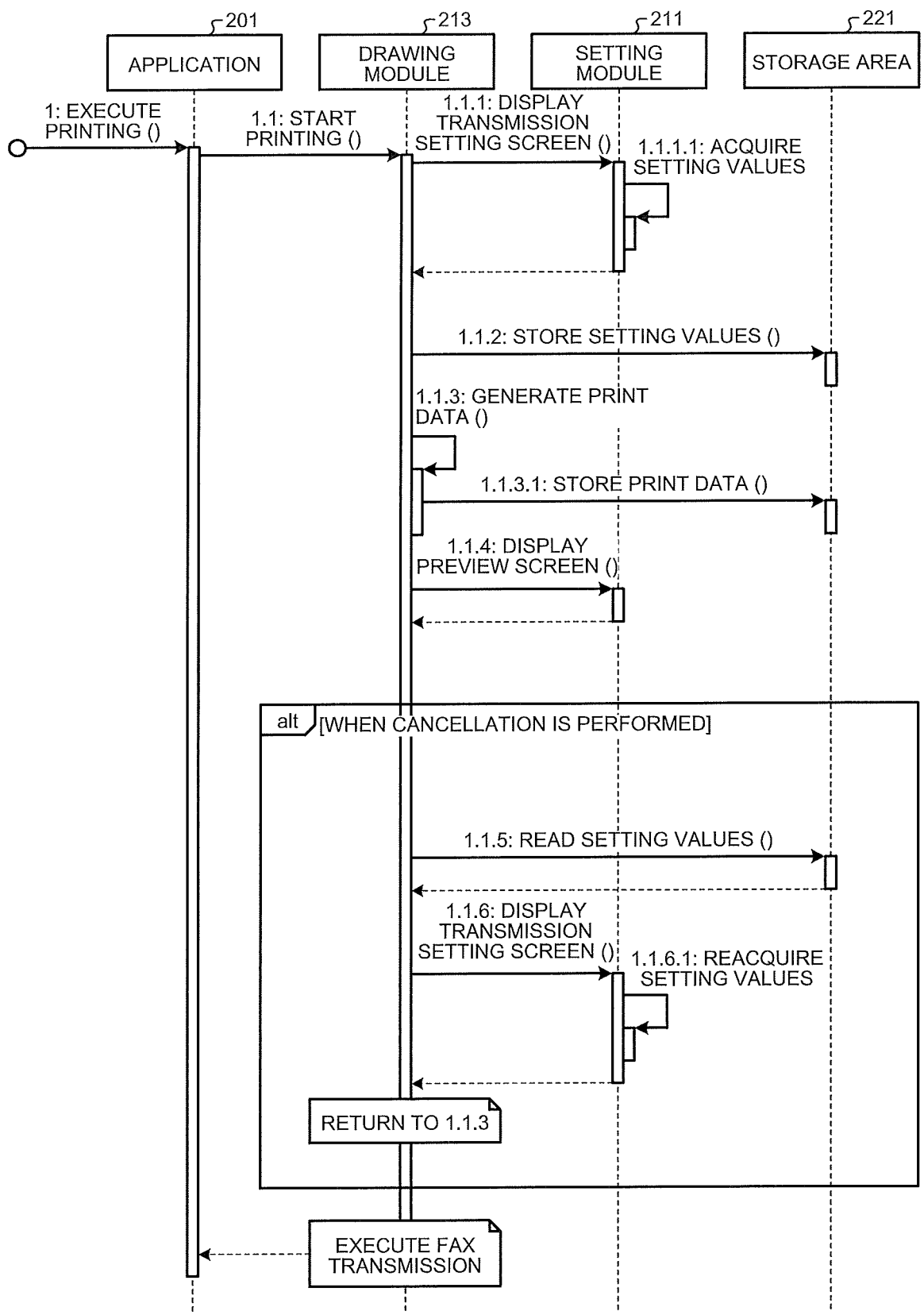
FIG. 10 is a sequence diagram illustrating an example of processing performed by the printer driver according to the first embodiment.

FIG. 10 is a sequence diagram illustrating an example of processing performed by the printer driver 202 according to the first embodiment. When a user performs operation for executing printing through the application 201 (1), the application 201 instructs the drawing module 213 to start printing (1.1). On receiving the printing start instruction, the drawing module 213 causes the display 35 to display the transmission setting screen 303 (1.1.1). The setting module 211 acquires setting values related to fax transmission that are input via the transmission setting screen 303 by the user (1.1.1.1). The acquired setting values are stored in the storage area 221 (1.1.2).

After that, the drawing module 213 generates print data based on information input via the print setting screen 302 by the user (1.1.3). The generated print data is stored in the storage area 221 (1.1.3.1). The drawing module 213 causes the display 35 to display the preview screen 304 based on the print data and the setting values (1.1.4).

When a cancellation operation is performed on the preview screen 304, the drawing module 213 reads setting values from the storage area 221 (1.1.5). Then, the drawing module 213 causes the display 35 to display the transmission setting screen 303 (the second setting screen) on which at least part of the read setting values are reflected in the corresponding spaces (1.1.6). The setting module 211 acquires setting values that are newly input by the user via the transmission setting screen 303 (the second setting screen) (1.1.6.1). After that, the processing is returned to 1.1.3. When an execution operation is performed on the preview screen 304, fax transmission is executed with contents displayed on the preview screen 304.

As described above, according to the present embodiment, when a cancellation operation is performed, the setting screen (the second setting screen) is displayed, on which at least part of the setting values that has been input before are reflected in the corresponding spaces. This configuration enables the user to avoid repeating the same setting operation and can improve convenience of the setting operation.

The other embodiment will be described below with reference to the accompanying drawings. The same numerals are given to practically the same components as the first embodiment and explanation thereof may be omitted.

Second Embodiment

Figure 11:
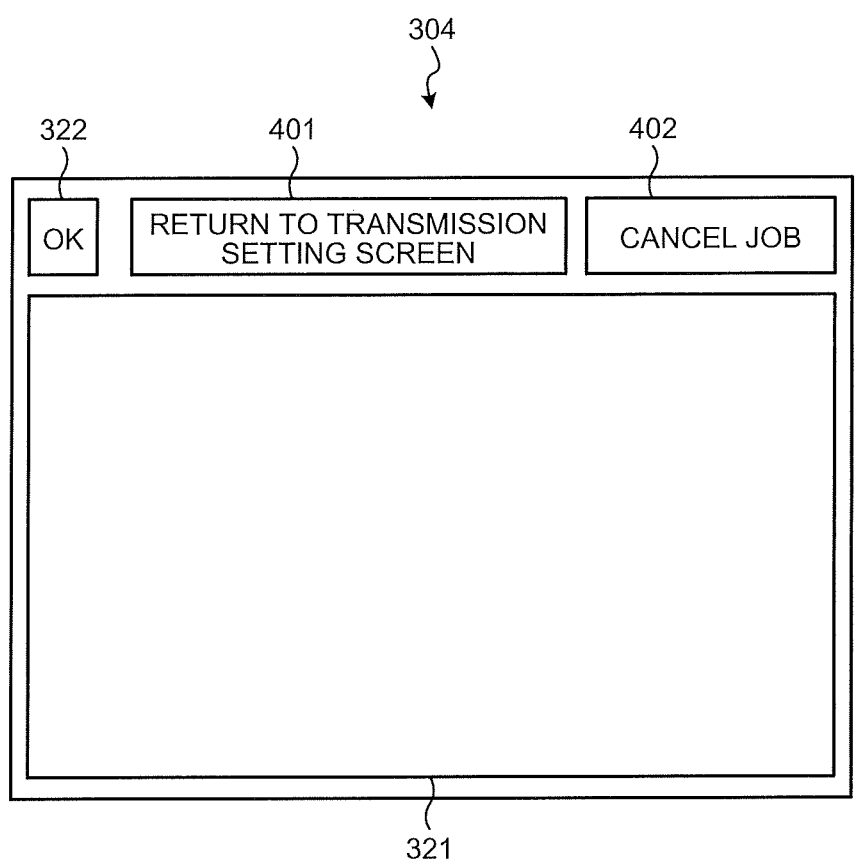
FIG. 11 is a view illustrating an example of a preview screen according to a second embodiment.

FIG. 11 is a view illustrating an example of a preview screen 304 according to a second embodiment. The preview screen 304 according to the present embodiment includes the image display space 321 for displaying an output image of fax transmission, the OK button 322 for executing the fax transmission, a return button 401 for returning a screen to the transmission setting screen 303 (the first canceling operation interface), and a job cancellation button 402 for canceling a job of the fax transmission (the second canceling operation interface).

The return button 401 according to the present embodiment is an operation interface that has the same function as the cancellation button 323 according to the foregoing first embodiment (FIG. 8). Specifically, when the return button 401 is pressed, the transmission setting screen 303 (the second setting screen) is displayed, on which at least part of the setting values stored in the storage unit 104 are reflected (displayed) in the corresponding spaces.

The job cancellation button 402 is an operation interface that is not included in the preview screen 304 according to the foregoing first embodiment. The job cancellation button 402 has a function of canceling a job of fax transmission. By pressing the job cancellation button 402 when the preview screen 304 is displayed, it is possible to discard all print data and setting values stored in the storage unit 104 (the storage area 221) and terminate the fax transmission processing.

Figure 12:
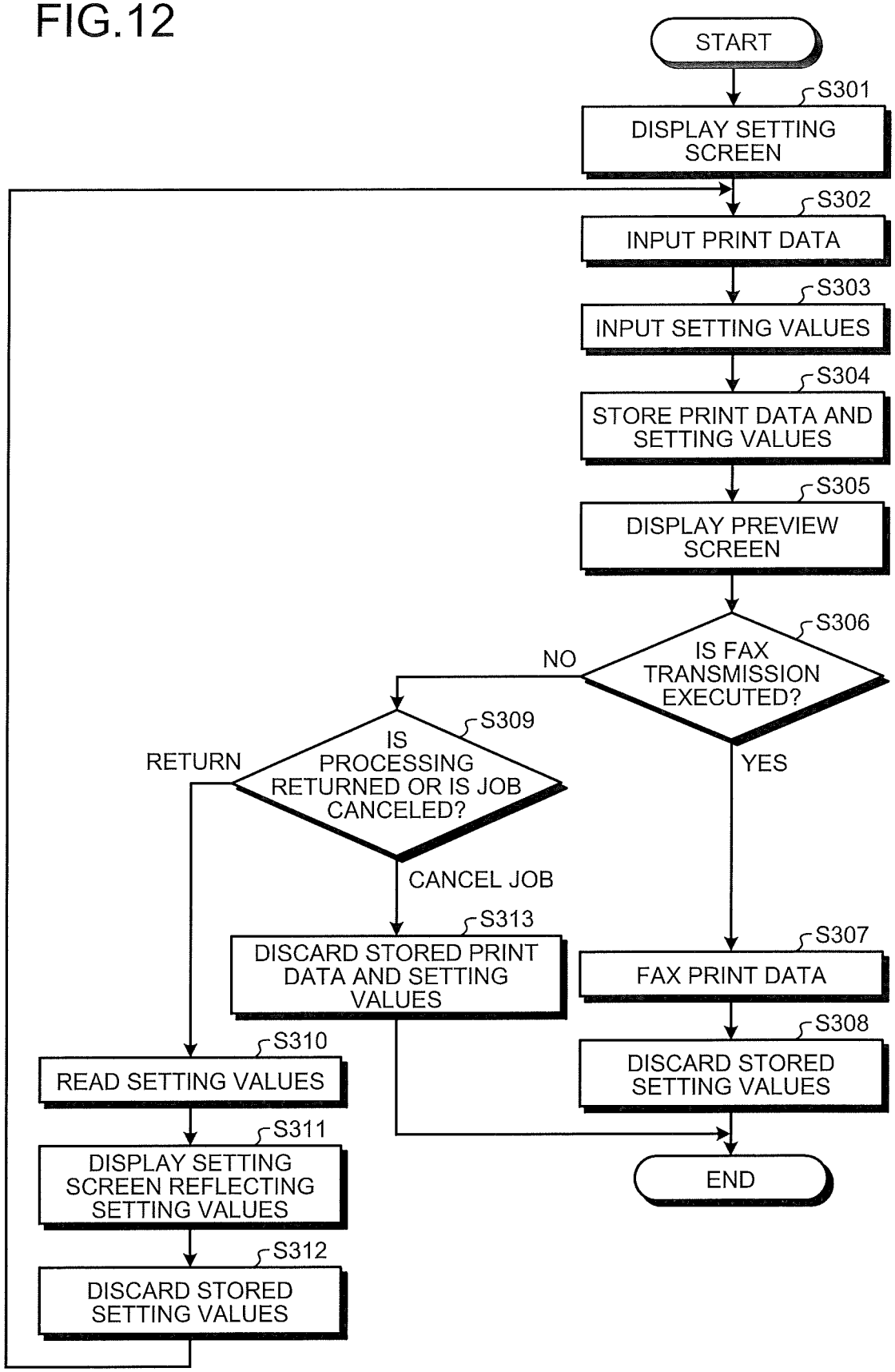
FIG. 12 is a flowchart illustrating an example of processing performed by the PC according to the second embodiment.

FIG. 12 is a flowchart illustrating an example of processing performed by the PC 13 according to the second embodiment. When the setting screen display unit 102 causes the display 35 to display a setting screen (the first setting screen) (S301), a user operates the operating unit 101 to input print data (S302) and inputs setting values related to fax transmission (S303). The storage unit 104 stores the print data and the setting values input by the user (S304). The preview screen display unit 103 causes the display 35 to display a preview screen representing contents of fax transmission based on the input print data and setting values (S305).

The operating unit 101 determines whether an execution operation for executing fax transmission (pressing of the OK button 322) is executed on a preview screen (S306). When the execution operation is performed (Yes at S306), the transmission processing unit 105 controls the MFPs 11 and 12 to fax print data to a destination address that setting values indicate (S307). The setting values stored in the storage unit 104 are discarded (S308).

On the other hand, when the execution operation is not performed (No at S306), the operating unit 101 determines which of a return operation for returning to transmission settings (pressing of the return button 401) and a cancelation operation for canceling a job (pressing of the job cancellation button 402) is executed (S309). When the return operation is performed ("Return" at S309), the setting screen display unit 102 reads setting values stored in the storage unit 104 (S310) and causes the display 35 to display a setting screen (the second setting screen) on which at least part of the read setting values are reflected in the corresponding spaces (S311). After that, the setting values stored in the storage unit 104 are discarded (S312), and the processing after step S302 (resetting of print data and setting values) is performed again.

When the cancellation operation for canceling the job is performed ("Cancel Job" at S309), print data and setting values stored in the storage unit 104 are discarded (S313), and the processing is terminated.

According to the present embodiment, when performing cancellation via the preview screen, the user can select either performing a reset via a setting screen (the second setting screen) on which at least part of the stored setting values are reflected, or cancelling the job itself. This configuration is able to further improve convenience of a setting operation.

Each of the functions disclosed in the foregoing embodiments can be implemented by one or more processing circuit(s). The "processing circuit" in the present specification may be a processor that is programmed to execute each function by software, such as a processor implemented by an electronic circuit and devices such as an application specific integrated circuit (ASIC), a digital signal processor (DSP), a field programmable gate array (FPGA) that are designed for executing each function described above and a conventional circuit module.

When at least part of the functions in the embodiments described above are implemented by execution of a computer program, the computer program is preliminarily incorporated in an appropriate storage device for provision. The computer program may be a file in an installable format or in an executable format, and be recorded in computer-readable recording media such as a compact disc read only memory (CD-ROM), a flexible disk (FD), a compact disc recordable (CD-R), and a digital versatile disc (DVD) so as to be provided. The computer program may be stored in a computer connected to a network such as the Internet and be downloaded through the network so as to be provided. The computer program may be provided or distributed through a network such as the Internet. The computer program may have a module configuration that includes at least part of the functions described above.

According to the present disclosure, convenience of a setting operation can be improved.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An information processing apparatus to which a facsimile device is communicably connected, the information processing apparatus comprising:
   an input device configured to receive an operation of a user;
   a memory; and
   processing circuitry coupled to the input device and the memory and controlling the facsimile device to fax print data,
   wherein the processing circuitry is configured to
      cause a display to display a print application screen;
      when a print operation is received on the print application screen, cause the display to display a fax transmission setting screen for making fax transmission settings based on input operations received by the input device;
      cause the display to display a preview screen including an output image of fax transmission based on the fax transmission settings made on the fax transmission setting screen, the preview screen including interface options for the user to enter a cancellation operation and to enter an execute fax operation;
      store, in the memory, setting values being input via the fax transmission setting screen; and
      when the cancellation operation is performed on the preview screen, cause the display to stop displaying the preview screen, read the stored setting values from the memory, and again display the fax transmission setting screen on which at least part of the setting values read from the memory are displayed again.

2. The information processing apparatus according to claim 1, wherein the processing circuitry is further configured to cause the display to display a print setting screen for making print settings related to the print data, when a particular operation is input to the displayed print application screen prior to the print operation being received.

3. The information processing apparatus according to claim 2, wherein the preview screen includes a first canceling operation interface to cause display of the fax transmission setting screen and a second canceling operation interface used for canceling a job of the fax transmission.

4. An information processing method implemented by processing circuitry controlling a facsimile device to fax print data, the information processing method comprising:
   causing a display to display a print application screen;
   when a print operation is received on the print application screen, causing the display to display a fax transmission setting screen for making fax transmission settings based on input operations received via an input device;
   causing the display to display a preview screen including an output image of fax transmission based on the fax transmission settings made on the fax transmission setting screen, the preview screen including interface options for the user to enter a cancellation operation and to enter an execute fax operation;

storing, in a memory of the computer, setting values being input via the fi fax transmission setting screen; and when the cancellation operation is performed on the preview screen, causing the display to stop displaying the preview screen, reading the stored setting values from the memory, and again displaying the fax transmission setting screen on which at least part of the setting values read from the memory displayed again.

5. The information processing method according to claim 4, further comprising displaying a print setting screen for making print settings related to the print data, when a particular operation is input to the displayed print application screen prior to the print operation being received.

6. The information processing method according to claim 5, wherein the preview screen includes a first canceling operation interface to cause display of the fax transmission setting screen and a second canceling operation interface used for canceling a job of the fax transmission.

7. A non-transitory computer-readable recording medium on which programmed instructions are stored, the programmed instructions causing processing circuitry controlling a facsimile device to fax print data to perform a method comprising:

causing a display to display a print application screen;

when a print operation is received on the print application screen, causing the display to display a fax transmission setting screen for making fax transmission settings based on input operations received via an input device;

causing the display to display a preview screen including an output image of fax transmission based on the fax transmission settings made on the fax transmission setting screen, the preview screen including interface options for the user to enter a cancellation operation and to enter an execute fax operation;

storing, in a memory, setting values being input via the fax transmission setting screen; and when the cancellation operation is performed on the preview screen, causing the display to stop displaying the preview screen, reading the stored setting values from the memory, and again displaying the fax transmission setting screen on which at least part of the setting values read from the memory are displayed again.

8. The non-transitory computer-readable recording medium according to claim 7, the method further comprising displaying a print setting screen for making print settings related to the print data when a particular operation is input to the displayed print application screen prior to the print operation being received.

9. The non-transitory computer-readable recording medium according to claim 8, wherein the preview screen includes a first canceling operation interface to cause display of the second setting screen and a second canceling operation interface used for canceling a job of the fax transmission.

10. The information processing method of claim 4, wherein a first portion of settings related to a facsimile are made via the print setting screen prior to receiving the print operation, and a second portion of the settings are made via the fax transmission setting screen after receiving the print operation.

11. The information processing apparatus of claim 1, wherein the processing circuitry is further configured to receive the fax transmission settings via the fax transmission setting screen, the fax transmission settings including at least one of a destination address, information on a cover letter, and information on an attachment file.

* * * * *